(12) United States Patent      (10) Patent No.:    US 12,654,561 B2

Salter et al.            (45) Date of Patent:      Jun. 16, 2026

(54) ASSISTIVE TRACTION DRIVE FORCES DURING TOWING EVENTS

(71) Applicant: FORD GLOBAL TECHNOLOGIES, LLC, Dearborn, MI (US)

(72) Inventors: Stuart C. Salter, White Lake, MI (US); Michael J. Kipley, Saline, MI (US); Matthew Simpson, Grosse Pointe Shores, MI (US); Ryan O'Gorman, Beverly Hills, MI (US); Pietro Buttolo, Dearborn Heights, MI (US); Peter Phung, Windsor (CA); William David Treharne, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 727 days.

(21) Appl. No.: 17/746,270

(22) Filed: May 17, 2022

(65) Prior Publication Data

US 2023/0373315 A1     Nov. 23, 2023

(51) Int. Cl.

| | |
|---|---|
| *B60L 15/20* | (2006.01) |
| *B60L 7/10* | (2006.01) |
| *B60L 53/57* | (2019.01) |
| *B60W 20/00* | (2016.01) |
| *B62D 59/04* | (2006.01) |

(52) U.S. Cl.
CPC ................. *B60L 15/20* (2013.01); *B60L 7/10* (2013.01); *B60L 53/57* (2019.02); *B60W 20/00* (2013.01); *B62D 59/04* (2013.01); *B60L 2200/28* (2013.01); *B60L 2240/14* (2013.01); *B60L 2240/463* (2013.01); *B60L 2240/465*

(2013.01); *B60L 2250/28* (2013.01); *B60W 2520/26* (2013.01); *B60W 2520/30* (2013.01); *B60W 2530/203* (2020.02); *B60W 2540/10* (2013.01); *B60W 2556/65* (2020.02)

(58) Field of Classification Search
CPC ........ B60L 15/20; B60L 7/10; B60L 2240/14; B60L 2250/28; B62D 59/04; B60W 2530/203; B60Y 2300/28
See application file for complete search history.

(56) References Cited

U.S. PATENT DOCUMENTS

| | | | |
|---|---|---|---|
| 7,815,476 B1 * | 10/2010 | Ross ..................... | B60F 3/0092 |
| | | | 440/11 |
| 11,178,813 B2 | 11/2021 | Velderman et al. | |
| 2010/0065344 A1 | 3/2010 | Collings, III | |
| 2010/0174484 A1 | 7/2010 | Sivasubramaniam et al. | |

(Continued)

*Primary Examiner* — Abby J Flynn
*Assistant Examiner* — Clint Pham
(74) *Attorney, Agent, or Firm* — David B. Kelley; Carlson, Gaskey & Olds, P.C.

(57) ABSTRACT

Systems and methods are proposed for coordinating and providing assistive traction drive forces during towing events between a motor vehicle and one or more charging trailers. The assistive traction drive forces may be provided in the form of a propulsive torque applied by an electric machine of the charging trailer. Electrical energy for powering the electric machine may be supplied by a powertrain system of the towing vehicle or an energy storage device of an electrified recreational/industrial vehicle that is operably connected to the charging trailer. Energy expended by the energy storage device for powering the electric machine may be replenished during the towing event by regenerative braking.

14 Claims, 5 Drawing Sheets

(56)                    References Cited

U.S. PATENT DOCUMENTS

| | | | |
|---|---|---|---|
| 2013/0257144 A1* | 10/2013 | Caldeira | B60L 58/20 |
| | | | 307/9.1 |
| 2018/0093655 A1* | 4/2018 | Healy | B60L 1/003 |
| 2018/0236994 A1* | 8/2018 | Healy | B60K 6/22 |
| 2019/0009760 A1* | 1/2019 | Zenner | B60T 8/323 |
| 2020/0276904 A1* | 9/2020 | Deaton | B60L 15/10 |
| 2022/0041069 A1* | 2/2022 | Layfield | B60L 7/10 |
| 2022/0126714 A1* | 4/2022 | Bucknor | B60L 53/53 |
| 2022/0126934 A1* | 4/2022 | Blomstrand | F16H 1/22 |

* cited by examiner

ASSISTIVE TRACTION DRIVE FORCES DURING TOWING EVENTS

TECHNICAL FIELD

This disclosure is directed to vehicle systems and methods for coordinating and providing assistive traction drive forces during towing events.

BACKGROUND

Motor vehicles include power sources for powering the drive wheels of the vehicles. For example, conventional motor vehicles include internal combustion engines that act as the vehicle power source, and electrified vehicles include traction battery pack powered electric machines that act as the vehicle power source. Some motor vehicles may be equipped for towing other structures, such as a trailer, for example.

SUMMARY

A mobile generator trailered system according to an exemplary aspect of the present disclosure includes, among other things, a towing vehicle and a charging trailer operably coupled to the towing vehicle. A control module is programmed to request an assistive propulsive torque from the charging trailer for assisting with acceleration or traction of the towing vehicle in response to a predefined torque condition, a predefined accelerator pedal request condition, a wheel slip condition, or an off-road condition of the towing vehicle.

In a further non-limiting embodiment of the foregoing system, an electrified recreational/industrial vehicle is operably coupled to the charging trailer.

In a further non-limiting embodiment of either of the foregoing systems, the assistive propulsive torque is supplied by an electric machine of the charging trailer and is powered by a traction battery pack of the electrified recreational/industrial vehicle or an energy storage system of the charging trailer.

In a further non-limiting embodiment of any of the foregoing systems, the control module is further programmed to determine an amount of regenerative braking necessary to charge the traction battery pack of the electrified recreational/industrial vehicle to a desired threshold subsequent to powering the electric machine.

In a further non-limiting embodiment of any of the foregoing systems, the control module is a component of the towing vehicle.

In a further non-limiting embodiment of any of the foregoing systems, the control module is a component of the charging trailer.

In a further non-limiting embodiment of any of the foregoing systems, the assistive propulsive torque is supplied by an electric machine of the charging trailer and is powered by a powertrain system of the towing vehicle.

In a further non-limiting embodiment of any of the foregoing systems, the powertrain system of the towing vehicle includes an internal combustion engine and an electric machine.

In a further non-limiting embodiment of any of the foregoing systems, the powertrain system includes an electric machine and an inverter system that establish an electric power take-off.

In a further non-limiting embodiment of any of the foregoing systems, the control module is further programmed to communicate a traction assistance end signal to the charging trailer for ending the assistive propulsive torque when the predefined torque condition, the predefined accelerator pedal request condition, the wheel slip condition, or the off-road condition ceases.

A motor vehicle according to another exemplary aspect of the present disclosure includes, among other things, a wheel, a powertrain system configured to provide a propulsive torque for propelling the wheel, and a control module programmed to communicate a traction assistance request signal to a structure separate from the motor vehicle during a towing event.

In a further non-limiting embodiment of the foregoing motor vehicle, the structure is a charging trailer.

In a further non-limiting embodiment of either of the foregoing motor vehicles, the powertrain system includes an internal combustion engine and an electric machine.

In a further non-limiting embodiment of any of the foregoing motor vehicles, the powertrain system includes an electric machine and an inverter system that establish an electric power take-off.

In a further non-limiting embodiment of any of the foregoing motor vehicles, the traction assistance request signal is indicative of a torque condition, an accelerator pedal condition, a wheel slip condition, or an off-road condition during the towing event.

In a further non-limiting embodiment of any of the foregoing motor vehicles, the control module is further programmed to communicate a traction assistance end signal to the structure when the torque condition, the accelerator pedal condition, the wheel slip condition, or the off-road condition ends.

In a further non-limiting embodiment of any of the foregoing motor vehicles, the control module is further programmed to calculate an amount of regenerative braking necessary to replenish an amount of energy expended in order to provide an assistive propulsive torque during the towing event.

In a further non-limiting embodiment of any of the foregoing motor vehicles, the assistive propulsive torque is supplied by an electric machine of the structure.

In a further non-limiting embodiment of any of the foregoing motor vehicles, the electric machine is powered by a traction battery pack of an electrified recreational/industrial vehicle that is operably coupled to the structure.

A method according to another exemplary aspect of the present disclosure includes, among other things, during a towing event in which a towing vehicle is towing a charging trailer, providing an assistive propulsive torque from the charging trailer for augmenting a traction drive force of the towing vehicle. The assistive propulsive torque is supplied by an electric machine of the charging trailer. The electric machine is powered by a traction battery pack of an electrified recreational/industrial vehicle that is operably coupled to the charging trailer.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing assistive traction drive forces during towing events between a motor vehicle and one or more charging trailers. The assistive traction drive force may be provided in the form of a propulsive torque applied by an electric machine of the charging trailer. Electrical energy for powering the electric machine may be supplied by a powertrain system of the towing vehicle or an energy storage device of an electrified recreational/industrial vehicle that is operably connected to the charging trailer. Energy expended by the energy storage device for powering the electric machine may be replenished during the towing event by regenerative braking. These and other features of this disclosure are discussed in greater detail in the following paragraphs of this detailed description.

Figure 1:
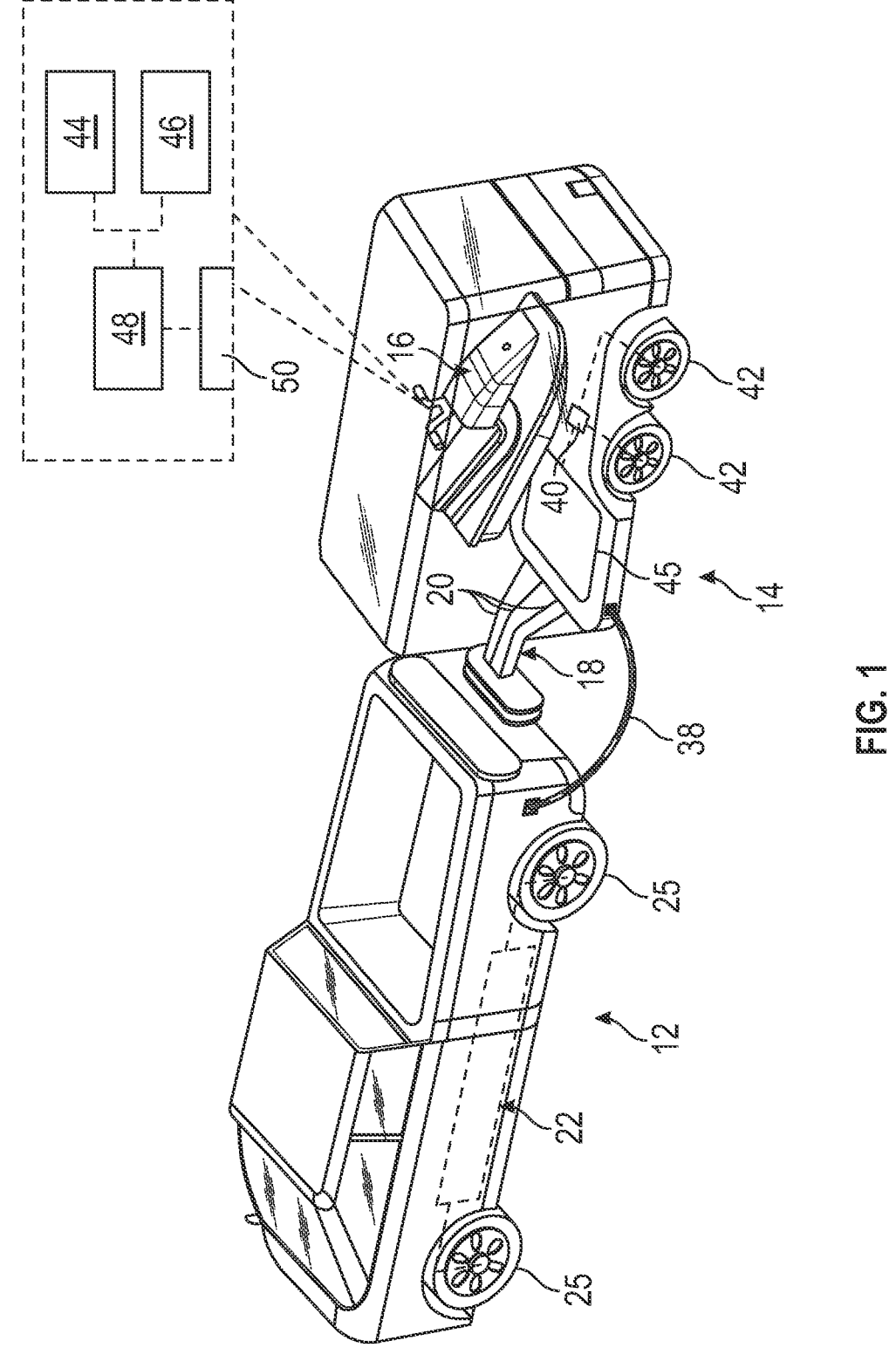
FIG. 1 schematically illustrates an exemplary mobile generator trailered system.

FIG. 1 schematically illustrates an exemplary mobile generator trailered system 10 (hereinafter "the system 10") capable of transferring energy between its respective energy units during towing events. The system 10 may include a towing or leading motor vehicle 12, one or more charging trailers 14, and one or more electrified recreational/industrial vehicles 16. Although one vehicle 12, one charging trailer 14, and one electrified recreational/industrial vehicle 16 are illustrated as being part of the system 10 within FIG. 1, this disclosure is not limited to this exact configuration of the system 10.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

A towing device 18 may releasably couple the charging trailer 14 to the vehicle 12 for allowing the vehicle 12 to tow the charging trailer 14. The towing device 18 may include electrical cabling 20 for operably coupling the respective units of the system 10, such as for communicating signals, enabling energy transfers, etc. The specific configuration of the towing device 18 is also not intended to limit this disclosure.

The vehicle 12 of FIG. 1 is schematically illustrated as a pickup truck. However, other vehicle configurations are also contemplated. The teachings of this disclosure may be applicable for any type of vehicle as the vehicle 12. For example, the vehicle 12 could be configured as a car, a truck, a van, a sport utility vehicle (SUV), etc.

The electrified recreational/industrial vehicle 16 is schematically illustrated as a personal watercraft. However, other recreational/industrial vehicle configurations are also contemplated. The teachings of this disclosure may be applicable for any type of recreational/industrial vehicle. For example, the one or more electrified recreational/industrial vehicles 16 could include any combination of all-terrain vehicles (ATV), utility vehicles (UTV), motorcycles, bikes, dirt bikes, snowmobiles, off-road vehicles, personal watercrafts, etc. Moreover, the term "electrified recreational/industrial vehicle" is inclusive of industrial/commercial equipment and related vehicles such as agricultural equipment (e.g., various tractors, backhoes, harvesters, drones, etc.) and/or construction equipment (e.g., towable light towers, skid-steer/compact track and various loaders, forklifts/telehandlers, mini excavators, boom/scissor and various lifts, carry deck cranes, trenchers, pavers, compactors, dozers, drum rollers, drones, etc.).

The vehicle 12 includes a powertrain system 22 for providing propulsive driving forces to one or more drive wheels 25 of the vehicle 12. The powertrain system 22 may also be configured for supplying electrical energy to the charging trailer 14 and/or the electrified recreational/industrial vehicle 16 during towing events. The vehicle 12 could be configured as a conventional motor vehicle, a plug-in hybrid electric vehicle (PHEV), a battery electric vehicle (BEV), etc.

Figure 2:
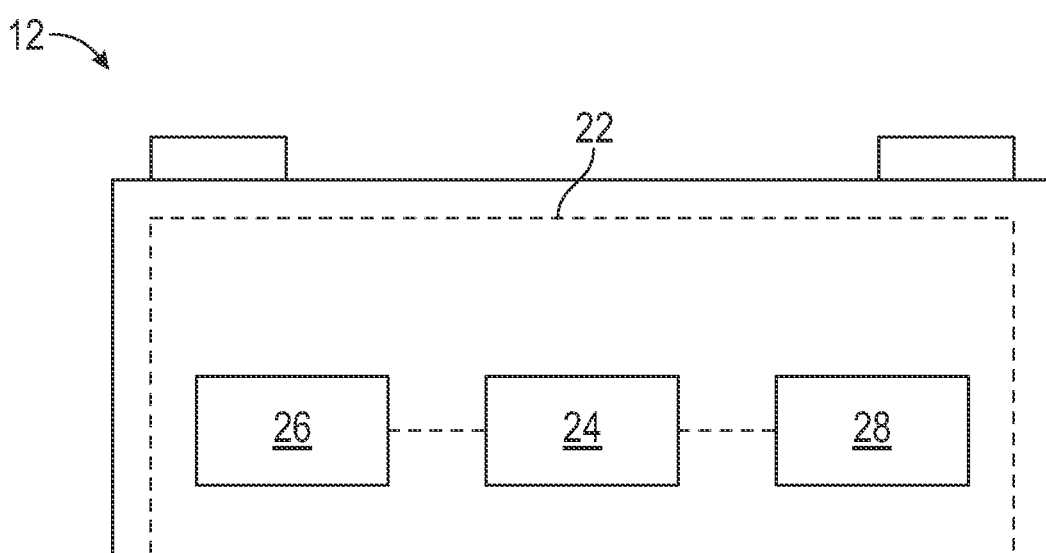
FIG. 2 schematically illustrates aspects of an exemplary motor vehicle of the mobile generator trailered system of FIG. 1.

In implementations in which the vehicle 12 is a conventional motor vehicle, the powertrain system 22 may include an internal combustion engine 24, a fuel tank 26 for storing fuel (e.g., gasoline, diesel, etc.) that may be used to power the internal combustion engine 24, and an electric machine 28 (see, e.g., FIG. 2). The electric machine 28 may convert mechanical energy from the internal combustion engine 24 into electrical energy that can be utilized to power electrical loads of the vehicle 12. The electrical energy could further be utilized to power electrical loads of the charging trailer 14 and/or the electrified recreational/industrial vehicle 16. In an embodiment, the electric machine 28 is a 48 Volt electric machine, and operating the internal combustion engine 24 can generate up to 10 Kilowatts of power through the electric machine 28 that can be redirected to the charging trailer 14 and/or the electrified recreational/industrial vehicle 16 during towing events.

Figure 3:
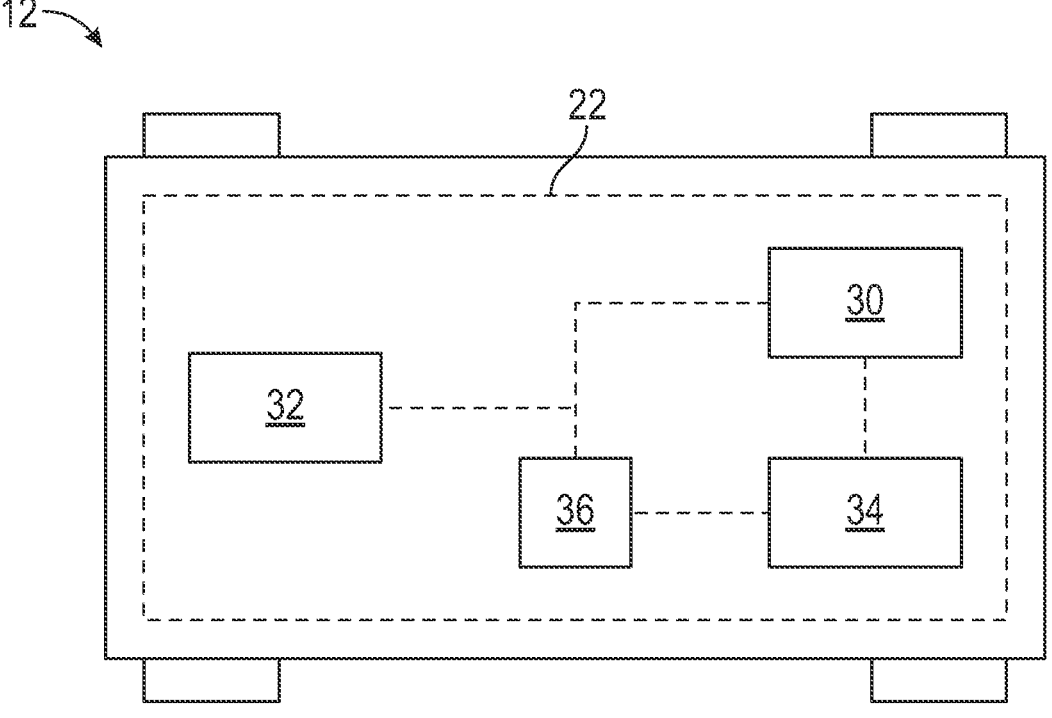
FIG. 3 schematically illustrates aspects of another exemplary motor vehicle of the mobile generator trailered system of FIG. 1.

In implementations in which the vehicle 12 is a plug-in type electrified vehicle, the powertrain system 22 may be an electrified powertrain that includes an electric machine 30 (e.g., an electric motor), a traction battery pack 32 for powering the electric machine 30, an inverter system 34, and an electric power take-off (see, e.g., FIG. 3). The traction battery pack 32 may be configured as a high voltage traction battery pack that includes a plurality of battery arrays (i.e., battery assemblies or groupings of battery cells) capable of outputting electrical power to the electric machine 30 of the vehicle 12. The inverter system 34 may be configured for enabling the transfer of power from the vehicle 12 to the charging trailer 14 and/or the electrified recreational/industrial vehicle 16. The electric power take-off 36 can convert energy from the traction battery pack 32 or the inverter system 34 and send the energy to devices external to the powertrain system 22. The electric power take-off 36 may perform functions such as changing the voltage of the energy to a different level, restricting the allowable current though the device, preventing power/energy transfer though the device, etc.

In an embodiment, electrical energy may be transferred from the vehicle 12 to the charging trailer 14 via the electrical cabling 20 of the towing device 18. In another embodiment, an electrical harness 38 that is configured to plug into respective electrical outlets of both the vehicle 12 and the charging trailer 14 may be provided for transferring the electrical energy.

Each charging trailer 14 of the system 10 may include an electric machine 40 (e.g., an electric motor) for selectively providing propulsive driving force to one or more drive wheels 42 of the charging trailer 14. In an embodiment, the charging trailer 14 does not include its own dedicated energy storage system for powering the electric machine 40 and therefore the electrical energy for powering the electric machine 40 may come from either the vehicle 12 or the electrified recreational/industrial vehicle 16. In another embodiment, the charging trailer includes a dedicated energy storage system 45.

In an embodiment, each electrified recreational/industrial vehicle 16 is an all-electric recreational/industrial vehicle having an electrified powertrain capable of applying torque from an electric machine 44 (e.g., an electric motor) for driving one or more drive devices (e.g., wheel, pump, etc.) of the electrified recreational/industrial vehicle 16. Each electrified recreational/industrial vehicle 16 may further include a traction battery pack 46 for powering the electric machine 44. The powertrain of each electrified recreational/industrial vehicle 16 may electrically propel the drive device without the assistance of an internal combustion engine.

The electrified recreational/industrial vehicle 16 may additionally include an inverter system 48. The inverter system 48 may be operably connected to the electric machine 40 of the charging trailer 14 via a power transfer interface 50. The electrified recreational/industrial vehicle 16 may interface with the charging trailer 14 over the power transfer interface 50. In an embodiment, the power transfer interface 50 is a wired connection.

The traction battery pack 46 of the electrified recreational/industrial vehicle 16 may be a removable high voltage traction battery that includes a plurality of battery cells or groupings of battery cells. In an embodiment, the traction battery pack 46 is a removable traction battery that may be swapped out and replaced with another traction battery.

During certain operating conditions, the vehicle 12 could potentially require propulsive torque assistance from the charging trailer 14 during select portions of an in-flight towing event. In this disclosure, the term "in-flight" means during the coupled movement of the vehicle 12 and the charging trailer 14, such as when the vehicle 12 is hauling or towing the charging trailer 14.

In an embodiment, the system 10 may coordinate and provide assistive propulsive torque from the charging trailer 14 for augmenting the traction drive force of the vehicle 12 during select portions of the towing event. Propulsive torque assistance from the charging trailer 14 may be achieved by providing a propulsive torque from the electric machine 40 to the drive wheels 42 of the charging trailer 14 to help "push" the vehicle 12 during the select portions of the towing event. For example, the propulsive torque assistance may be required to accelerate the vehicle 12 for reaching freeway speeds, passing another vehicle, or scaling a relatively steep grade during the towing event. The propulsive torque assistance could also be required during wheel slip conditions or off-road operating conditions of the vehicle 12. This disclosure therefore describes exemplary embodiments for coordinating and providing assistive propulsive torque from the charging trailer 14 to the vehicle 12 during towing events.

Figure 4:
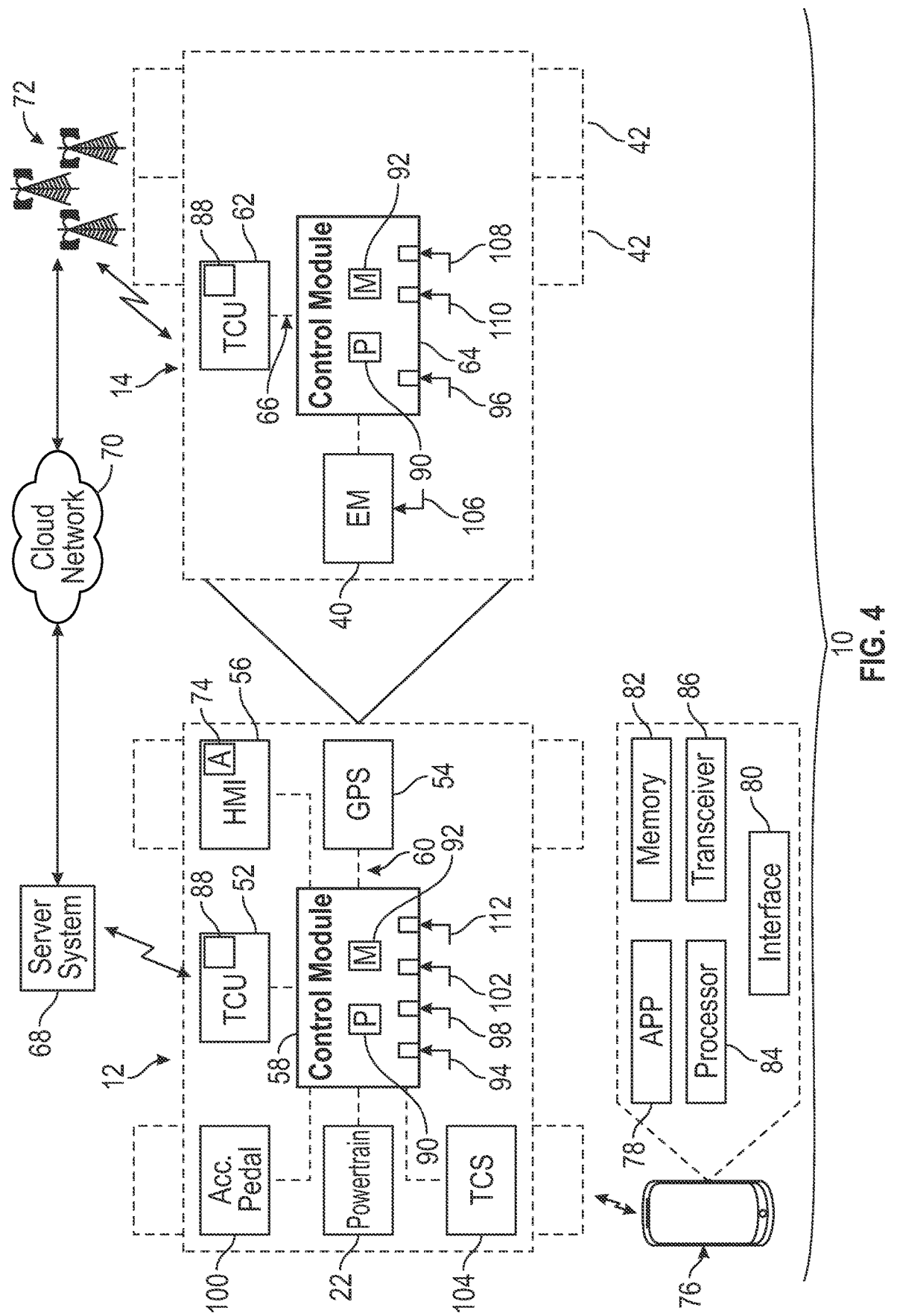
FIG. 4 schematically illustrates exemplary propulsive torque assistance aspects of a mobile generator trailered system.

Additional functionality of the system 10 of FIG. 1 is further detailed with reference to FIG. 4. In particular, FIG. 4 schematically illustrates features that enable the system 10 to coordinate and provide assistive propulsive torque from the charging trailer 14 to the vehicle 12 during select portions of a towing event.

Both the vehicle 12 and the charging trailer 14 (and, in some embodiments, the electrified recreational/industrial vehicle 16) may include components that contribute to the overall functionality of the system 10. For example, the vehicle 12 may include a telecommunications module 52, a global positioning system (GPS) 54, a human machine interface (HMI) 56, and a control module 58. These components may be interconnected and in electronic communication with one another over a communication bus 60. The communication bus 60 may be a wired communication bus such as a controller area network (CAN) bus, or a wireless communication bus such as Wi-Fi, Bluetooth®, Ultra-Wide Band (UWB), etc.

The charging trailer 14 may include a telecommunications module 62 and a control module 64. These components may be interconnected and in electronic communication with one another over a communication bus 66. The communication bus 66 may be a wired communication bus such as a controller area network (CAN) bus, or a wireless communication bus such as Wi-Fi, Bluetooth®, Ultra-Wide Band (UWB), etc.

The telecommunications modules 52, 62 may be configured for achieving bidirectional communications between the vehicle 12 and the charging trailer 14 over a cloud-based server system 68, such as for coordinating when to provide the assistive propulsion torque from the charging trailer 14, for example. Each telecommunications module 52, 62 may communicate over a cloud network 70 (e.g., the internet) to obtain various information stored on the server system 68 or to provide information to the server system 68 that can subsequently be accessed by the vehicle 12 and/or the charging trailer 14 (or any other participating units of the system 10).

The server system 68 can identify, collect, and store user data associated with the vehicle 12 for validation purposes. Upon an authorized request, data may be subsequently transmitted to the telecommunications modules 52, 62 via one or more cellular towers 72 or some other known communication technique (e.g., Wi-Fi, Bluetooth®, data connectivity, etc.). The information can then be communicated to the control modules 58, 64 for further processing. Each telecommunications module 52, 62 can receive data from the server system 68 or communicate data back to the server system 68 via the cellular tower(s) 72. Although not necessarily shown or described in this highly schematic embodiment, numerous other components may enable bidirectional communications between the vehicle 12, the charging trailer 14, and the server system 68.

In a first embodiment, a user/owner of the vehicle 12 may interface with the server system 68 using the HMI 56. For example, the HMI 56 may be equipped with an application 74 (e.g., Sync® or another similar application) for interfacing with the server system 68. The HMI 56 may be located within a passenger cabin of the vehicle 12 and may include various user interfaces for displaying information to the vehicle occupants and for allowing the vehicle occupants to enter information into the HMI 56. The vehicle occupants may interact with the user interfaces via touch screens, tactile buttons, audible speech, speech synthesis, etc.

In another embodiment, the user/owner of the vehicle 12 could alternatively or additionally interface with the server system 68 using a personal electronic device 76 (e.g., a smart phone, tablet, computer, wearable smart device, etc.). The personal electronic device 76 may include an application 78 (e.g., FordPass™ or another similar application) that includes programming to allow the user to employ one or more user interfaces 80 for setting or controlling certain aspects of the system 10. The application 78 may be stored in memory 82 of the personal electronic device 76 and may be executed by a processor 84 of the personal electronic device 76. The personal electronic device 76 may additionally include a transceiver 86 that is configured to communicate with the server system 68 over the cellular tower(s) 72 or some other wireless link.

Each telecommunications module 52, 62 may additionally include one or more wireless devices 88 that can facilitate communications between the vehicle 12 and the charging trailer 14. Various information and signals may be exchanged between the vehicle 12 and the charging trailer 14 via the wireless devices 88. In an embodiment, the wireless devices 88 are Bluetooth® Low Energy (BLE) transceivers configured to receive and/or emit low energy signals as a way to detect and communicate with participating vehicles. However, other types of wireless devices (e.g., WiFi, V2V, etc.) are also contemplated within the scope of this disclosure for enabling bidirectional communications between the vehicle 12 and the charging trailer 14.

The GPS 54 is configured to pinpoint locational coordinates of the vehicle 12, such as by using satellite navigation techniques. The GPS 54 may utilize geopositioning techniques or any other satellite navigation techniques for estimating the geographic position of the vehicle 12 at any point in time. GPS data from the GPS 54 may be further used to identify elevation/terrain variations along a given drive route and/or for other trip planning tasks.

The control modules 58, 64 may each include both hardware and software and could be part of an overall vehicle control system, such as a vehicle system controller (VSC), or could alternatively be stand-alone controllers separate from the VSC. In an embodiment, each control module 58, 64 is programmed with executable instructions for interfacing with and commanding operation of various components of the system 10. Although shown as separate modules within the highly schematic depiction of FIG. 4, the telecommunications module 52, the GPS 54, the HMI 56, and the control module 58 could be integrated together as part of common module of the vehicle 12.

Each control module 58, 64 may include a processor 90 and non-transitory memory 92 for executing various control strategies and modes associated with the system 10. The processors 90 may be custom made or commercially available processors, central processing units (CPUs), or generally any device for executing software instructions. The memories 92 can include any one or combination of volatile memory elements and/or nonvolatile memory elements. Each processor 90 may be operably coupled to the memory 92 and may be configured to execute one or more programs stored in the memory 92 based on various inputs received from other devices associated with the system 10.

In an embodiment, based at least on a first input signal 94 from the powertrain system 22 of the vehicle 12, the control module 58 may communicate (e.g., via the telecommunications modules 52, 62) a traction assistance request signal 96 to the control module 64 of the charging trailer 14. In an embodiment, the first input signal 94 is indicative of a predefined torque condition associated with a power source (e.g., the internal combustion engine 24 or the electric machine 30) of the vehicle 12. For example, the first input signal 94 may be communicated to the control module 64 when a torque output of the power source is greater than or equal to 50% of the maximum torque output of the power source. However, other thresholds may alternatively or additionally be programmed for establishing when the traction assistance request signal 96 is to be communicated from the vehicle 12 to the charging trailer 14.

In another embodiment, the control module 58 may communicate the traction assistance request signal 96 to the control module 64 of the charging trailer 14 in response to receiving a second input signal 98 from an accelerator pedal 100 of the vehicle 12. In an embodiment, the second input signal 98 is indicative of a predefined pedal angle or travel distance associated with the accelerator pedal 100. For example, the second input signal 98 may be communicated to the control module 58 when a position of the accelerator pedal 100 (as detected by an accelerator pedal position sensor, for example) is greater than or equal to 50% of a maximum pedal position of the accelerator pedal 100. However, other thresholds may alternatively or additionally be programmed for establishing when the traction assistance request signal 96 is to be communicated from the vehicle 12 to the charging trailer 14.

In yet another embodiment, the control module 58 of the vehicle 12 may communicate the traction assistance request signal 96 to the control module 64 of the charging trailer 14 in response to receiving a third input signal 102 from a traction control system (TCS) 104 of the vehicle 12. In an embodiment, the third input signal 102 is indicative of a wheel slip condition of the vehicle 12, such as that which may occur when the vehicle 12 and charging trailer 14 are operating on a wet or otherwise slippery roadway and are stopped at a stoplight, operating on a relatively steep grade, etc., or could be indicative of an off-road operating condition of the vehicle 12, such as that which may occur on uneven or relatively difficult operating sections of a given roadway, for example. The TCS 104 may communicate the third input signal 102 in response to any detected wheel slip condition or off-road operating condition of the vehicle 12.

The traction assistance request signal 96 indicates to the charging trailer 14 that the vehicle 12 requires propulsion torque assistance for achieving a desired level of acceleration or traction during the towing event. For example, the propulsion torque assistance could be needed to accelerate to a freeway speed, pass another vehicle, ascend a steep grade, accommodate for wheel slip conditions, navigate terrain associated with off-road conditions, etc. In response to receiving the traction assistance request signal 96, the control module 64 of the charging trailer 14 may communicate an assistive propulsion torque request signal 106 for commanding the electric machine 40 of the charging trailer 14 to turn on for powering the one or more drive wheels 42. In this way, the charging trailer 14 may be operated in coordination with the vehicle 12 in order to contribute propulsive torque (e.g., traction drive forces) for helping to accelerate or provide a desired level of traction to the vehicle 12 during the towing event.

In implementations in which the charging trailer 14 lacks a dedicated energy storage system, the electrical energy necessary for powering the electric machine 40 for providing the propulsive torque assistance must come from elsewhere. In an embodiment, the electrical energy necessary for powering the electric machine 40 may be supplied by the electric machine 28 or the electric power take-off 36 of the vehicle 12. In such a scenario, that vehicle 12 may temporarily suspend power to non-essential vehicle systems (e.g., climate compressors or heaters, etc.) in order to maintain the electric machine 28 or the electric power take-off 36 within is optimal operating specifications.

In another embodiment, the electrical energy necessary for powering the electric machine 40 may be supplied by traction battery pack 46 of the electrified recreational/industrial vehicle 16, the energy storage system 45 of the charging trailer 14, or both. In such scenarios, the control module 58 may request battery prognostic information 108 from the traction battery pack 46 and/or the energy storage system 45 in response to receiving the traction assistance request signal 96. The battery prognostic information 108 may include information such as current state of charge (SOC), estimated travel range, depth of discharge (DOD) mapping, internal resistance, current battery cell temperatures, and other battery metrics (e.g., voltage, current, battery size, battery type/chemistry, charge rate levels, charge acceptance levels, battery cell aging information, etc.) associated with the traction battery pack 46 and/or the energy storage system 45. Based at least on the available power transfer rate and total power capacity of the traction battery pack 46 and/or the energy storage system 45 (and similar parameters of energy storage systems available from other charging trailers or electrified recreational/industrial vehicles linked to the system 10) and the size of the electric machine 40, the control module 58 may compute how much assistive propulsive torque can be provided by the charging trailer 14. As part of the assistive propulsion torque request signal 106, the control module 58 may demand the max available propulsion torque or the specific amount required. The electric machine 40 may then be turned on to provide the assistive propulsive torque for a relatively short period of time. Other methodologies are further contemplated within the scope of this disclosure for determining the amount of traction assistance to be provided by the electric machine 40.

In situations where multiple charging trailers 14 are operably coupled to the vehicle 12, the assistive propulsive torque required for accommodating an acceleration event or traction event may be distributed across two or more charging trailers. Moreover, if charging trailer alignment becomes skewed during a pushing event as identified by the system 10, the electric machines of the respective charging trailers may balance forward force by redistributing the torque load between each respective charging trailer drivetrain.

The control module 58 of the vehicle 12 may communicate a traction assistance end signal 110 to the control module 64 of the charging trailer 14 when the vehicle 12 no longer requires propulsive torque assistance for acceleration or traction events. This may occur, for example, when the torque output of the powertrain system 22 falls below 50% of the maximum torque of the power source, when the position of the accelerator pedal 100 is moved to less than 50% of the maximum pedal position of the accelerator pedal 100, when the vehicle 12 reaches a predefined speed or has not detected any wheel slippage for a predefined amount of time (e.g., 3 or more seconds), etc.

In another embodiment, the control module 58 of the vehicle 12 may communicate the traction assistance end signal 110 to the control module 64 of the charging trailer 14 when the acceleration of the vehicle 12 is within a predefined percentage (e.g., 2% to 50%) of a normal acceleration of the vehicle 12 for a given torque output of the power source of the powertrain system 22. The normal acceleration for any given torque output of the power source may be information that is stored in a lookup table within the memory 92 of the control module 58 and that is accessible by the processor 90 for determining whether or not to communicate the traction assistance end signal 110 to the charging trailer 14.

The traction assistance end signal 110 indicates to the charging trailer 14 that the operating conditions of the vehicle 12 no longer indicate a need for propulsive torque assistance during the towing event. In response to receiving the traction assistance end signal 110, the control module 64 of the charging trailer 14 may command the electric machine 40 of the charging trailer 14 to turn off and thus stop providing the propulsive torque assistance.

The control module 58 of the vehicle 12 may further be programmed to calculate, in real-time, an amount of regenerative braking to apply to the drive wheels 42 of the charging trailer 14 in order to replenish the amount of energy that was expended by the traction battery pack 46 for powering the electric machine 40 as part of the process for providing the assistive propulsive torque. During regenerative braking, the powertrain system 22 of the vehicle 12 and the electric machine 40 of the charging trailer 14 may cooperate as part of a regenerative braking system, which is essentially an energy recovery mechanism. The regenerative braking system can be used to reduce, or maintain, the speed of the vehicle 12, while recovering energy and generating power that can be stored in the traction battery pack 46 for replenishing its energy levels. The regenerative braking system may apply a negative torque to the drive wheels 25 and/or the drive wheels 42 to maintain a speed, slow down, or to limit acceleration of the vehicle 12 down a grade, for example. The negative torque may be converted to electricity that can then be stored within the traction battery pack 46.

As part of the regenerative braking calculation, the control module 58 may consider trip planner information 112 obtained from the GPS 54. The trip planner information 112 may account for segments along the planned drive route that may be advantageous for regenerative braking by leveraging known road characteristics (e.g., steep declines, sections suitable for coasting, etc.). By leveraging the trip planner information 112 and various other parameters (e.g., weight and dimensions of the charging trailer 14), the traction battery pack 46 may be charged to a desired threshold via regenerative braking before arriving at a destination or waypoint of the planned drive route. The amount of regenerative braking necessary for replenishing the traction battery pack 46 may further be spread out evenly over the entire drive route, thereby minimizing any potential drawbacks to the vehicle 12.

In another embodiment, the control module 58 may be further programmed to recommend one or more alternative routes to the user when it is determined that the traction battery pack 46 cannot be charged to the desired threshold via regenerative braking under current route and trailer attributes. The recommendation to alter the drive route may be presented on the HMI 56 and/or the personal electronic device 76, for example.

Figure 5:
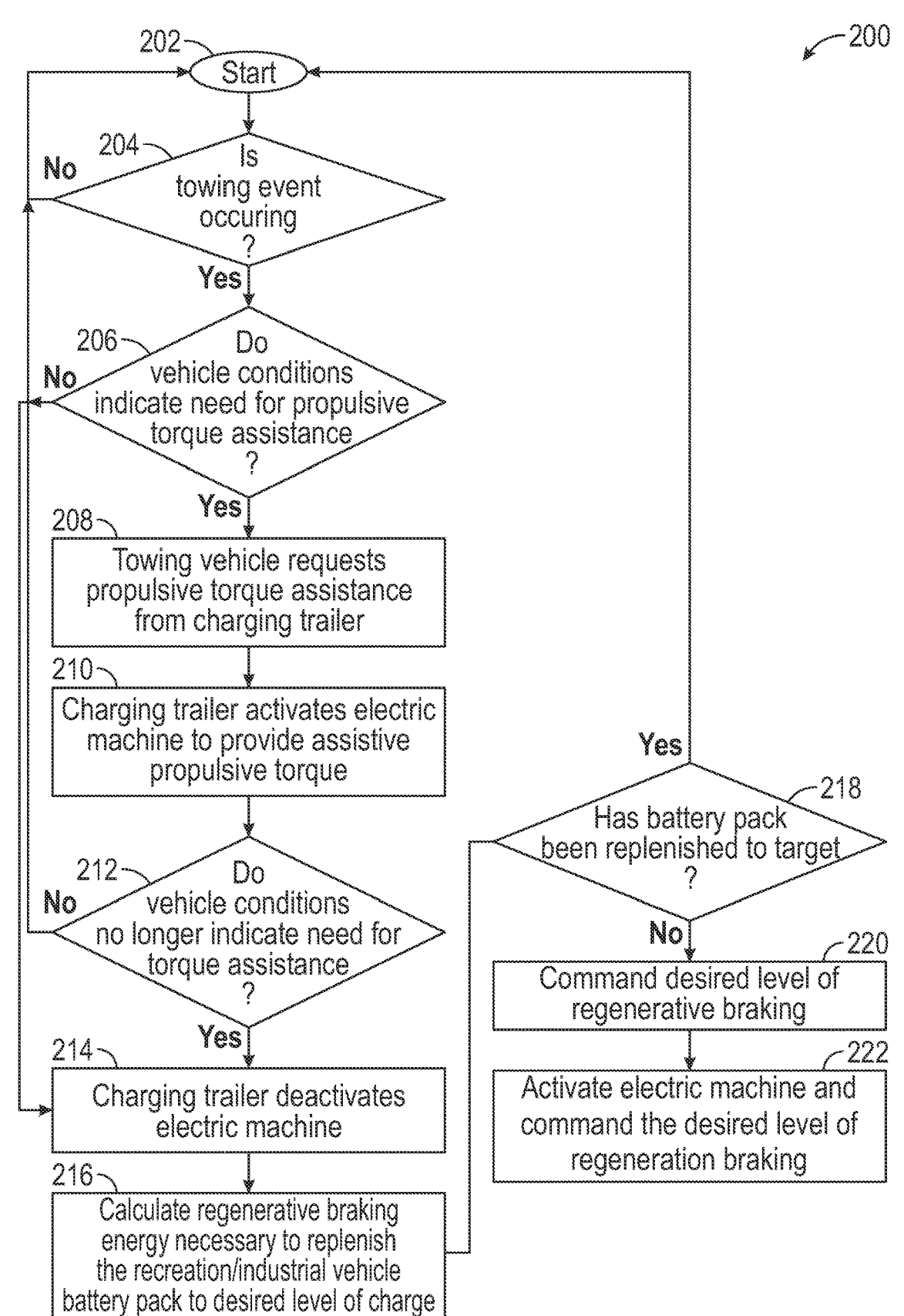
FIG. 5 is a flow chart of an exemplary method for coordinating and providing assistive propulsive torque within a mobile generator trailered system during vehicle towing events.

FIG. 5, with continued reference to FIGS. 1-4, schematically illustrates in flow chart form an exemplary method 200 for coordinating and providing assistive propulsive torque from the charging trailer 14 to the vehicle 12 during towing events in which the vehicle 12 is towing the charging trailer 14. The system 10 may be configured to employ one or more algorithms adapted to execute the steps of the exemplary method 200. For example, the method 200 may be stored as executable instructions in the memory 92 of each control module 58, 64, and the executable instructions may be embodied within any computer readable medium that can be executed by the processor 90 of each of the control modules 58, 64.

The exemplary method 200 may begin at block 202. At block 204, the method 200 may determine whether the vehicle 12 and the charging trailer 14 are engaged in a towing event. In an embodiment, the towing event is an in-flight towing event in which the vehicle 12 and the charging trailer 14 are connected by the towing device 18 and, optionally, the electrical harness 38.

If a YES flag is returned at block 204, the method 200 may proceed to block 206 by determining whether any vehicle operating conditions associated with the vehicle 12 indicate a need for propulsive torque assistance in order to achieve a desired level of acceleration or traction during the towing event. Exemplary operating conditions that may signify a need for propulsive torque assistance include but are not limited to torque conditions in which an output torque of the power source of the vehicle 12 exceeds a predefined threshold, pedal conditions in which a pedal position of the accelerator pedal 100 exceeds a predefined threshold, wheel slip conditions, off-road conditions, etc. If a NO flag is returned at block 206, the method 200 may proceed to block 214 (discussed below).

If any detected vehicle condition of the vehicle 12 indicates the need for propulsive torque assistance at block 206, the vehicle 12 may communicate the traction assistance request signal 96 to the charging trailer 14 at block 208. In response to receiving the traction assistance request signal 96, the charging trailer 14 may command the electric machine 40 to be turned on and commanded to provide a desired level of torque output for providing a traction drive to one or more drive wheels 42 of the charging trailer 14 at block 210. The assistive propulsive torque helps to accelerate the vehicle 12 or helps the vehicle 12 to gain sufficient traction during the towing event.

The method 200 may thereafter determine whether the vehicle conditions no longer indicate the need for continuing the propulsive torque assistance at block 212. The vehicle conditions may indicate that the need no longer exists for providing the propulsive torque assistance in various ways. For example, torque assistance may no longer be needed when the output torque of the power source of the vehicle 12 is below a predefined threshold, the pedal position of the accelerator pedal 100 is below a predefined threshold, wheel slip or off-road conditions have ceased, a predefined amount of time has passed, a predefined amount of energy from the traction battery pack 46 has been expended, etc. In another embodiment, the method 200 may determine that the assistive propulsive torque is no longer required when the acceleration of the vehicle 12 is within a predefined percentage of a normal acceleration of the vehicle 12 for a given torque output of the power source.

If propulsive torque assistance is no longer required (or vehicle conditions no longer indicate need for propulsive torque assistance at block 206), the charging trailer 14 may command the electric machine 40 to be turned off at block 214. When turned off, the electric machine 40 no longer provides drive force assistance to the vehicle 12.

Next, at block 216, the method 200 may calculate an amount of regenerative braking energy necessary to charge the traction battery pack 46 of the electrified recreational/industrial vehicle 16 to a desired level of charge. The method 200 may then determine whether the traction battery pack 46 has been replenished to the desired level of charge at block 218. If YES, the method 200 may return to block 202 as part of an open loop process. If NO, the method 200 may command the desired level of regenerative braking to occur at block 220. The method 200 may then activate the electric machine 40 of the charging trailer 14 and command the desired level of regenerative braking at block 222 before returning to block 202 in anticipation of the next propulsive assistance event.

Figure 6:
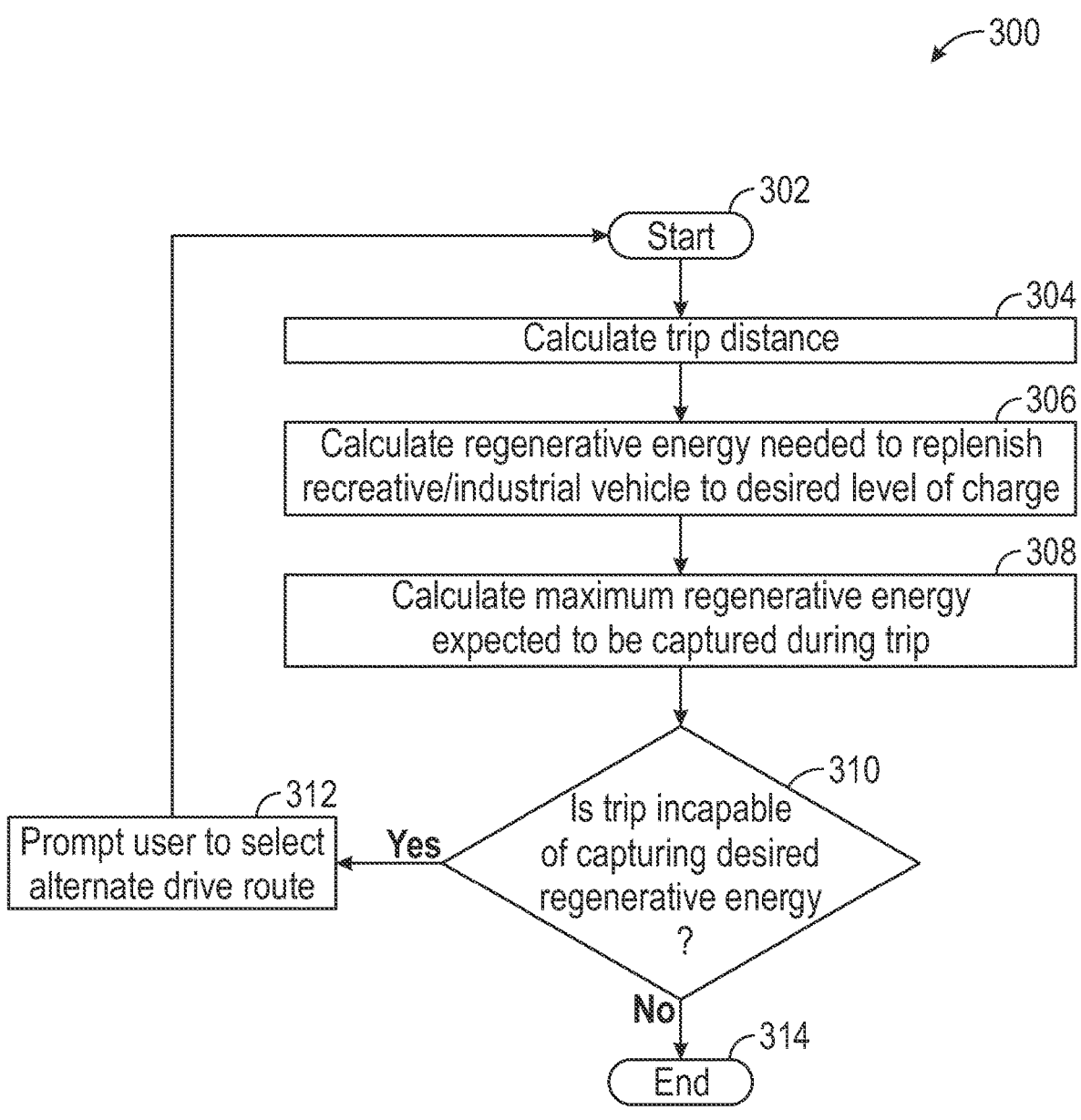
FIG. 6 is a flow chart of an exemplary method for assessing whether an amount of regenerative energy captured during a trip is sufficient to replenish an energy level of a battery pack to a desired level.

FIG. 6, with continued reference to FIGS. 1-5, schematically illustrates in flow chart form an exemplary method 300 for determining whether a planned trip will capture enough generative braking to replenish the level of charge of the battery pack 46 of the electrified recreational/industrial vehicle 16 to a desired level. The system 10 may be configured to employ one or more algorithms adapted to execute the steps of the exemplary method 300. For example, the method 300 may be stored as executable instructions in the memory 92 of each control module 58, 64, and the executable instructions may be embodied within any computer readable medium that can be executed by the processor 90 of each of the control modules 58, 64.

The exemplary method 300 may begin at block 302. At block 304, the method 300 may calculate a trip distance that is expected to be traveled during an upcoming towing event. The method 300 may next calculate the regenerative energy needed to replenish the traction battery pack 46 of the electrified recreational/industrial vehicle 16 to a desired level of charge at block 306. Then, at block 308, the method 300 may calculate the maximum regenerative energy that is expected to be captured during the trip.

The method 300 may subsequently determine whether the trip is incapable of capturing the desired amount of regenerative energy at block 310. If YES, the method 300 prompts the user to select an alternate route at block 312. If NO, the method 300 ends at block 314.

The mobile generator trailered systems and methods of this disclosure are designed to coordinate and provide propulsive torque assistance to the leading/towing vehicle during towing events. The propulsive torque assistance can help the vehicle accelerate or gain traction when vehicle conditions so dictate. Furthermore, the propulsive torque assistance can be provided by the trailed structure even when the trailered structure lacks a dedicated energy storage system for providing short periods of powered traction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A mobile generator trailered system, comprising:
   a towing vehicle including a power source and an accelerator pedal;
   a charging trailer operably coupled to the towing vehicle;

an electrified recreational/industrial vehicle operably coupled to the charging trailer, wherein the electrified recreational/industrial vehicle is a separate vehicle from the towing vehicle; and a control module programmed to request an assistive propulsive torque from the charging trailer for assisting with acceleration or traction of the towing vehicle when a torque output of the power source is greater than or equal to 50% of a maximum torque output of the power source or when a position of the accelerator pedal is greater than or equal to 50% of a maximum pedal position of the accelerator pedal, wherein the assistive propulsive torque is supplied by an electric machine of the charging trailer, and the electric machine is powered by a traction battery pack of the electrified recreational/industrial vehicle.

2. The system as recited in claim 1, wherein the control module is further programmed to determine an amount of regenerative braking necessary to charge the traction battery pack of the electrified recreational/industrial vehicle to a desired threshold subsequent to powering the electric machine.

3. The system as recited in claim 1, wherein the assistive propulsive torque is powered by a powertrain system of the towing vehicle.

4. The system as recited in claim 3, the powertrain system of the towing vehicle includes an internal combustion engine and an electric machine.

5. The system as recited in claim 3, wherein the powertrain system includes an electric machine, an inverter system, and an electric power take-off.

6. The system as recited in claim 1, wherein the control module is further programmed to communicate a traction assistance end signal to the charging trailer for ending the assistive propulsive torque when the torque output of the power source falls below 50% of the maximum torque output of the power source or when the position of the accelerator pedal is less than 50% of the maximum pedal position of the accelerator pedal.

7. The system as recited in claim 1, wherein the electrified recreational/industrial vehicle is an all-terrain vehicle (ATV), a utility vehicle (UTV), a motorcycle, a bike, a snowmobile, an off-road vehicle, a personal watercraft, a tractor, a backhoe, a harvester, a drone, a towable light tower, a forklift/telehandler, an excavator, a boom/scissor lift, a cranes, a trencher, a paver, a compactor, a dozer, or a drum roller.

8. The system as recited in claim 1, comprising a second charging trailer and a second electrified recreational/industrial vehicle operably coupled to the second charging trailer, wherein the assistive propulsive torque is supplied by both the charging trailer and the second charging trailer.

9. A motor vehicle, comprising:

a wheel;

a powertrain system configured to provide a propulsive torque for propelling the wheel; and a control module programmed to communicate a traction assistance request signal to a structure separate from the motor vehicle during a towing event when a torque output of a power source of the powertrain system is greater than or equal to 50% of a maximum torque output of the power source, wherein the control module is further programmed to calculate an amount of regenerative braking necessary to replenish an amount of energy expended in order to provide an assistive propulsive torque during the towing event, wherein the assistive propulsive torque is supplied by an electric machine of the structure, and the electric machine is powered by a traction battery pack of an electrified recreational/industrial vehicle that is operably coupled to the structure, wherein the amount of regenerative braking is an amount necessary to charge the traction battery pack of the electrified recreational/industrial vehicle to a desired threshold subsequent to powering the electric machine of the structure.

10. The motor vehicle as recited in claim 9, wherein the structure is a charging trailer.

11. The motor vehicle as recited in claim 9, wherein the powertrain system includes an internal combustion engine and an electric machine.

12. The motor vehicle as recited in claim 9, wherein the powertrain system includes an electric machine and an inverter system that establish an electric power take-off.

13. The motor vehicle as recited in claim 9, wherein the control module is further programmed to communicate a traction assistance end signal to the structure when the torque output of the power source falls below 50% of the maximum torque output of the power source.

14. A method, comprising:

during a towing event in which a towing vehicle is towing a charging trailer, providing an assistive propulsive torque from the charging trailer for augmenting a traction drive force of the towing vehicle, wherein the assistive propulsive torque is supplied by an electric machine of the charging trailer, and wherein the electric machine is powered by a traction battery pack of an electrified recreational/industrial vehicle that is operably coupled to the charging trailer, wherein the electrified recreational/industrial vehicle is an all-terrain vehicle (ATV), a utility vehicle (UTV), a motorcycle, a bike, a snowmobile, an off-road vehicle, a personal watercraft, a tractor, a backhoe, a harvester, a drone, a towable light tower, a forklift/telehandler, an excavator, a boom/scissor lift, a cranes, a trencher, a paver, a compactor, a dozer, or a drum roller.

* * * * *